United States Patent [19]

Nakagawa

[11] Patent Number: 4,837,754
[45] Date of Patent: Jun. 6, 1989

[54] ULTRASONIC WAVE PHASE MATCHING APPARATUS

[75] Inventor: Yukio Nakagawa, Sagamihara, Japan

[73] Assignee: Fuji Electric Co., Ltd., Kawasaki, Japan

[21] Appl. No.: 131,983

[22] Filed: Dec. 11, 1987

[30] Foreign Application Priority Data

Dec. 16, 1986 [JP] Japan .................. 61-299219

[51] Int. Cl.$^4$ .................................................. G01S 9/68
[52] U.S. Cl. ................................. 367/105; 367/103; 367/123
[58] Field of Search ............... 367/105, 103, 123, 119, 367/122, 125, 129

[56] References Cited

U.S. PATENT DOCUMENTS

| | | | |
|---|---|---|---|
| 3,859,622 | 1/1975 | Hutchison et al. | 367/105 |
| 4,070,642 | 1/1978 | Iinuma et al. | 367/105 |
| 4,116,229 | 9/1978 | Pering | 367/105 |
| 4,159,462 | 6/1979 | Rocha et al. | 367/105 |
| 4,180,790 | 12/1979 | Thomas | 367/105 |
| 4,215,584 | 8/1980 | Kuroda et al. | 367/105 |
| 4,234,940 | 11/1980 | Iinuma | 367/105 |
| 4,235,111 | 11/1980 | Hassler | 367/105 |
| 4,241,610 | 12/1980 | Anderson | 367/105 |
| 4,276,779 | 7/1981 | Davis, Jr. | 367/105 X |
| 4,330,875 | 5/1982 | Tachita et al. | 367/105 |
| 4,336,605 | 6/1982 | Vancha | 367/105 |
| 4,348,902 | 9/1982 | Tachita et al. | 367/105 X |
| 4,351,038 | 9/1982 | Alais | 367/105 |
| 4,455,630 | 6/1984 | Loonen | 368/105 X |
| 4,458,533 | 7/1984 | Borburgh | 367/105 X |
| 4,484,477 | 11/1984 | Buxton | 367/105 X |
| 4,510,586 | 4/1985 | Grall et al. | 367/105 X |
| 4,528,854 | 7/1985 | Shimazaki | 367/105 X |
| 4,628,738 | 12/1986 | Burckhardt et al. | 367/105 X |
| 4,707,813 | 11/1987 | Moeller et al. | 367/105 X |

Primary Examiner—Thomas H. Tarcza
Assistant Examiner—John B. Sotomayor
Attorney, Agent, or Firm—Brumbaugh, Graves, Donohue & Raymond

[57] ABSTRACT

In the ultrasonic wave phase matching diagnostic apparatus described in the specification, an array of ultrasonic transducers is arranged to transmit ultrasonic waves to an object to be investigated and to receive ultrasonic waves returned from the object. Focusing of the waves to a point in the object is accomplished by selective delaying of the transmitted signals from each of the ultrasonic transducers, and similar delays are imposed on received signals to define a focal point for signals received from the object. Scanning of the object is provided by stepwise changes in the ultrasonic transducers used for transmitting and receiving ultrasonic signals, and half-pitch scanning may be effected by using different numbers of ultrasonic transducers for transmission and reception of the ultrasonic waves.

1 Claim, 5 Drawing Sheets

ULTRASONIC WAVE PHASE MATCHING APPARATUS

This invention relates to wave phase matching apparatus for processing transmitted and received signals in an electronic scanning-type ultrasonic diagnostic system and, more particularly, to a new and improved ultrasonic wave phase matching apparatus adapted to perform either half-pitch scanning or full-pitch scanning.

BACKGROUND OF THE INVENTION

Figure 1:
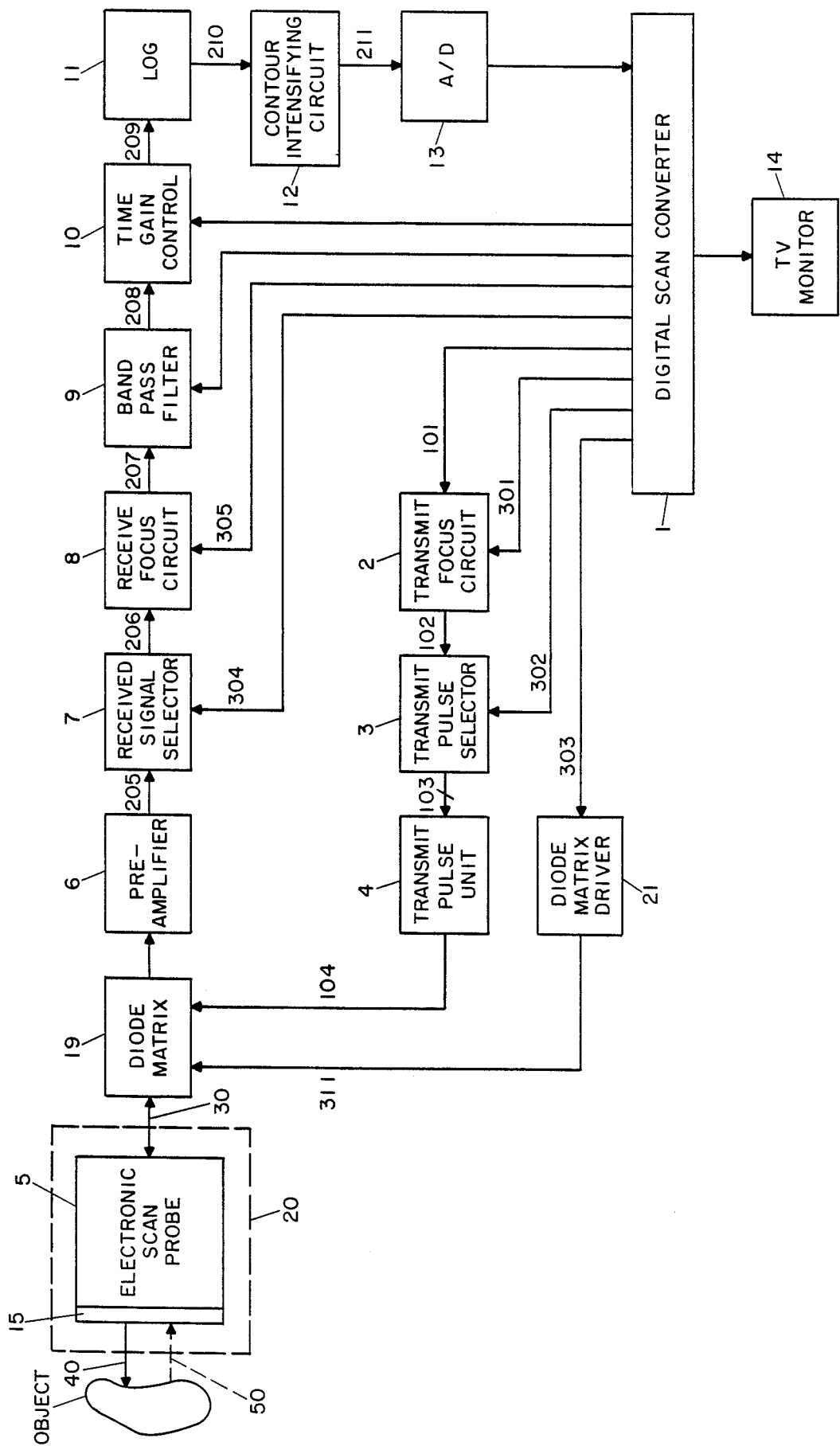
FIG. 1 is a schematic block circuit diagram showing a conventional ultrasonic diagnostic system.

A typical circuit configuration of a conventional ultrasonic diagnostic system is illustrated in the schematic block diagram in FIG. 1. In this diagram, reference numeral 1 designates a conventional digital scan converter (hereinafter abbreviated to DSC) for controlling the entire ultrasonic diagnostic system. To obtain ultrasonic images, the DSC 1 first sends transmit timing pulses 101 to a transmit focus circuit 2. The transmit focus circuit 2 imposes delays on the transmit timing pulses 101 using delay lines contained therein to selectively generate delayed transmit timing pulses 102 having a delay times of from a few ns to a few hundreds of ns (1 ns = $1 \times 10^{-9}$ second). These delay times are controlled by a control signal 301 from the DSC 1 in accordance with a desired focal point (focal position) for the ultrasonic electronic focusing.

The number of delayed transmit timing pulses 102 produced by the transmit focus circuit 2 corresponds to half the number of ultrasonic transducers 15 among eighty such transducers contained in an electronic scan probe 5 to be simultaneously excited to produce converging ultrasonic waves if the number of the transducers to be excited is an even number, or half of the next higher number of the number of transducers to be excited is an odd number. For instance, where thirteen adjacent ultrasonic transducers 15 out of an array of eighty transducer elements in the electronic scan probe 5 are simultaneously excited, seven delay transmit pulses are needed.

This group of delay transmit timing pulses 102 is sent to a selector 3. In this selector 3, the seven delay transmit timing pulses 102 are converted by means of a switch array consisting of twenty corresponding switches into twenty selectively delayed transmit timing pulses 103 consisting of thirteen delay transmit timing pulses and seven no-pulse intervals. Selection of these timing pulses 103 is achieved by a control signal 302 from the DSC 1. The twenty selectively delayed transmit timing pulses 103 are sent to a transmit pulse unit 4 containing twenty transmit pulse generators by which thirteen ultrasonic transmit pulse voltage signals 104 are generated. The output ultrasonic transmit pulse voltage signals of the twenty transmit pulse generators in the unit 4 are sent through a diode matrix 19 and a cable 30 to the electronic scan probe 5.

Figure 2:
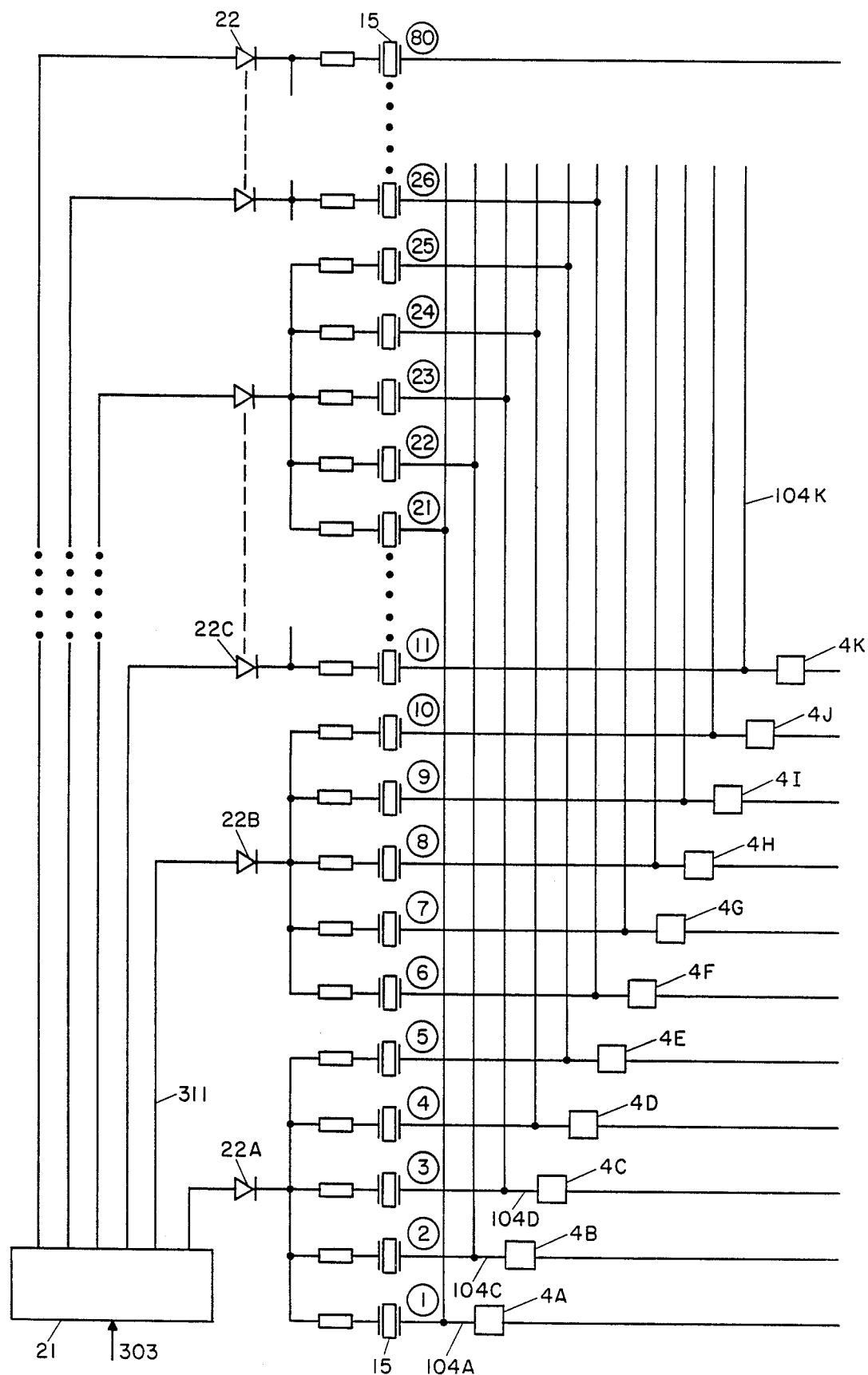
FIG. 2 is a fragmentary schematic circuit diagram showing a diode matrix and ultrasonic transducer portion in the conventional system.

Specifically, as shown in FIG. 2, the transmit pulse unit 4 contains transmit pulse generators designated 4A, 4B, 4C, and so on, which are individually connected to the eighty ultrasonic transducers 15 designated by ①-⑳, ㉑-㊵, ㊶-⑥⑩ and ⑥①-⑧⓪ of the electronic scan probe 5. The ultrasonic transducers 15 are preferably piezoelectric transducers and are arranged in sixteen groups of five transducers each, each group being connected to a corresponding one of sixteen diodes 22A, 22B, 22C, and so on, these diodes being generally designated as 22. Each diode 22 is turned off by a reverse bias and turned on by a forward bias applied by a diode control signal 311 from a diode matrix driver 21 controlled by a control signal 303 from the DSC 1.

For instance, when thirteen ultrasonic transducers 15 designated by ①-⑬ are to be excited, ultrasonic excite signals are applied to thirteen signal lines 104A-104M of the lines for the ultrasonic transmit pulse voltage signals generally designated as 104. (In FIG. 2, not all of the transducers and signal lines are illustrated, but it will be understood that corresponding additional transducers and signal lines are included in the embodiment.) These excite signals turn on the diodes 22A, 22B, 22C, and, as a result, the ultrasonic transducers 15 designated as ①-⑬ are excited to generate transmitted ultrasonic beams 40 as indicated in FIG. 1.

These transmitted ultrasonic beams 40 are directed into an object to be examined or to be measured and are then reflected by foreign materials and the like within the object. Ultrasonic waves 50 returned from the object are received by the electronic scan probe 5 and, after passing through the diode matrix 19, they are amplified by a preamplifier 6. Eighty ultrasonic received signals 205 thus amplified are sent to a selector 7 in the succeeding stage.

In the selector 7, only specified received signals are selected from the eighty amplified ultrasonic received signals 205. The selection process differs depending on the scanning system used. In the following example, the case will be described of selecting certain of the signals received from the eighty transducers which have transmitted signals during the transmit period. From the eighty amplified ultrasonic received signals 205, the signals from the thirteen transducers are selected by the selector 3 of the preceding stage. Because the same delay times will be imposed on the signals from each pair of receiving transducers which is symmetrical with respect to the focus point of the ultrasonic signals, by a receive focus circuit 8 of the succeeding stage, those thirteen signals are reduced to seven by a control signal 304 from the DSC 1.

The seven selected, amplified ultrasonic received signals 206 are sent to the receive focus circuit 8. In this receive focus circuit 8, in order to intensify only the received signals coming from a specified point, which is usually selected in the vicinity of the focal point established in the transmit period, the aforementioned received signals 206 returned from the specified point and received by the thirteen blocks are subjected to an electronic focusing technique similar to the aforementioned electronic focusing technique used in the transmitting process which imposes optimum delay times using self-contained delay lines to achieve phase coincidence. These delay times are controlled by a control signal 305 from the DSC 1. The selected, amplified received signals thus subjected to electronic focusing are combined into a single ultrasonic received signal 207 which is sent through the receive focus circuit 8 to a bandpass filter 9.

Since the center of the frequency components of the single ultrasonic received signal 207 shifts progressively toward a low frequency band as the reflection point of the ultrasonic waves moves deeper in the object, a bandpass filter is required which has a high S/N ratio and a variable center frequency. In the bandpass filter 9, which has three characteristics, the S/N ratio is enhanced and optimum frequency components are extracted, and a resultant frequency-discriminated ultrasonic received signal 208 is sent to a time gain control (hereinafter abbreviated to TGC) circuit 10 where the signal is amplified in proportion to the depth so as to compensate for attenuation of the ultrasonic waves within the object. Usually, the attenuation factor is about 0.5 dB/MHz/cm.

Since the TGC 10 produces an output ultrasonic received signal 209 which has a wide dynamic range, the dynamic range of the signal 209 is compressed in a log (logarithmic processing) circuit 11 to produce a log-processed ultrasonic received signal 210. This signal 210 then is processed in a contour-intensifying circuit 12 to produce a contour-intensified ultrasonic received signal 211 in which the contour of the ultrasonic image is intensified. The contour-intensified ultrasonic received signal 211 is converted into a digital signal in an A/D converter 13 and, after receiving the necessary picture processing in the DSC 1, the ultrasonic image is sent to a TV monitor 14 where the ultrasonic image is displayed.

Figure 3:
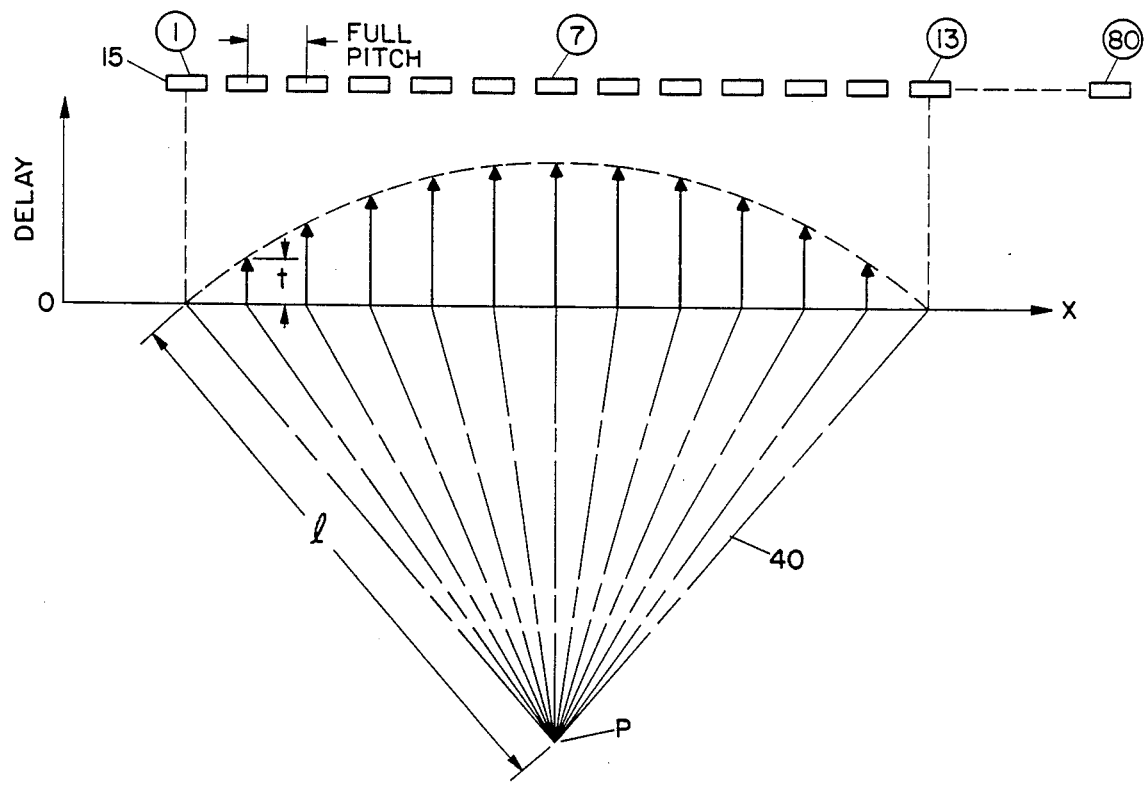
FIG. 3 is a schematic graphical diagram useful in explaining the delay times in the conventional system of FIG. 1.

FIG. 3 is a diagram explanatory of one method of converging ultrasonic beams in the conventional ultrasonic diagnostic system of the foregoing configuration. The process of obtaining one scan line of ultrasonic waves by exciting thirteen ultrasonic transducers ①-① ③ of the ultrasonic transducer array which is made up of the ultrasonic transducers 15 designated by ①- ⑩ will be described with reference to FIG. 3.

In FIG. 3, the focal point of the ultrasonic beams 40 is designated by P and the outgoing plane of ultrasonic waves is represented by a straight line O-X. The distance between the ultrasonic outgoing plane and the focal point differs with respect to the individual ultrasonic transducers ①- ⑬, that is, the distance l between the line O-X and the point P is the longest for the transducers ① and ⑬ and is the shortest for the transducer ⑦. Therefore, transmit timing control must be performed in such a manner that each emission of ultrasonic wave of the ultrasonic transducers ②- ⑫ is delayed from that of the transducers ① and ⑬ by the time t corresponding to the time required for each ultrasonic wave to propagate the difference in the distances.

The delay time t in the emission of each of the ultrasonic transducers ②- ⑫ is proportional to the height (the length of each solid-line arrow in FIG. 3) of a bow-shaped area bounded by the outgoing plane O-X and an arc of radius l which crosses the outgoing plane O-X at the front of each of the ultrasonic transducers ① and ⑬. Each delay time t is introduced by the control signal 301 form the DSC 1 using the delay lines in the transmit focus circuit 2. In this connection, since the delay times t for the ultrasonic transducers ①-⑥ ⑥ are symmetrical to those for the ultrasonic transducers ⑧- ⑬ with the ultrasonic transducer ⑦ centered, only seven delay transmit timing pulses 102 are generated in the transmit focus circuit 2 since that number is half of the number of the thirteen excited ultrasonic transducers plus one. Because of the foregoing configuration, the delay-imposed ultrasonic waves emitted from the ultrasonic transducers ①- ⑬ are in phase at the focal point P and act so as to mutually intensify their strength through interference.

The foregoing process is also true for the receive focus circuit 8. That is, delays are imposed upon the seven received signals 206 reduced by the selector 7 in a similar manner to the foregoing to achieve phase coincidence and those signals are added together in the adder to obtain the single ultrasonic received signal 207.

The process has been described of obtaining one scan line by focusing the ultrasonic waves of the thirteen transducers at the focal point P. Therefore, by repeating the foregoing scanning operation using each group of thirteen ultrasonic transducer blocks excited at a time, each group consisting of ②-⑭, ③-⑮, and so on, and being displaced one place from the preceding group in the X-direction, full-pitch scanning can be accomplished which provides one scan line per one pitch, one pitch corresponding to the center-to-center distance of adjacent ultrasonic transducers.

On the other hand, by repeating the scanning operation using groups of excited ultrasonic transducers in which the number of transducers in each group is altered between even and odd, but using the same transducers for the transmit period and the corresponding receive period, half-pitch scanning can be accomplished which provides one scan line per half-pitch.

Figure 4:
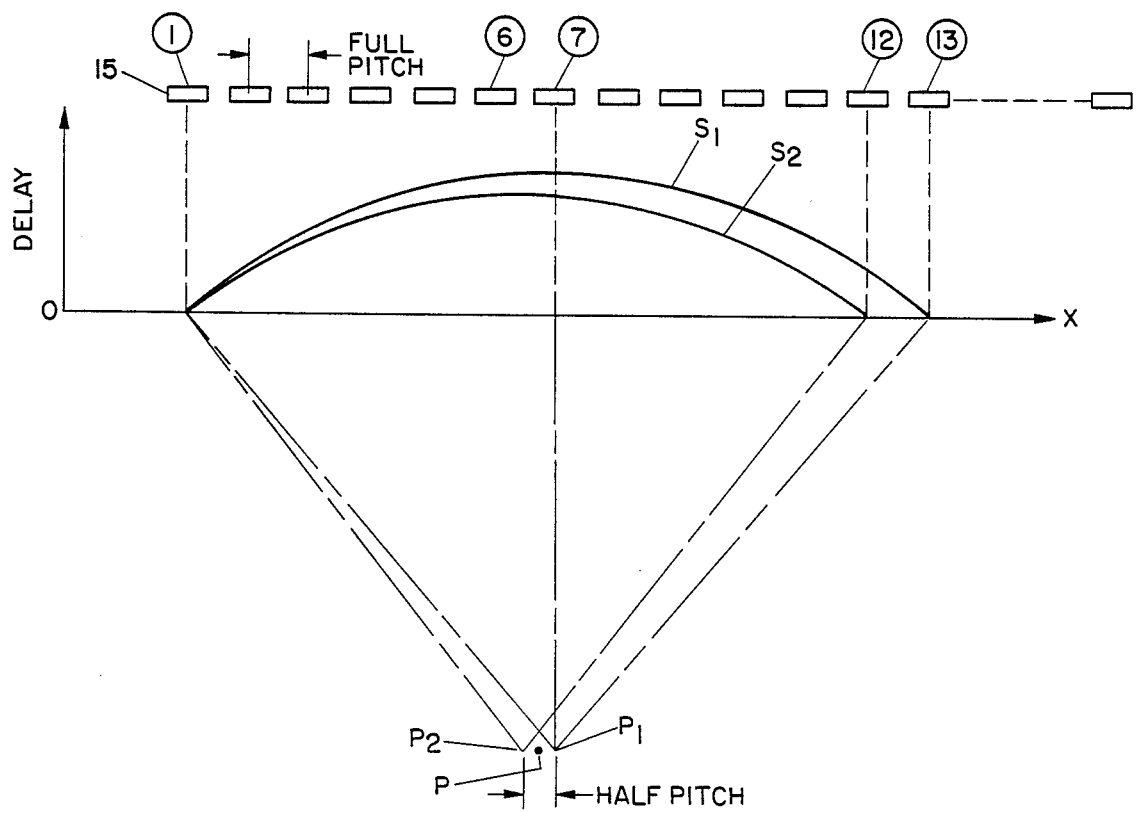
FIG. 4 is a schematic graphical diagram, similar to that of FIG. 3, which is useful in explaining half-pitch scanning in the conventional system.

FIG. 4 is a diagram explanatory of a different conventional half-pitch scanning process in which the number of ultrasonic transducers excited in the transmit period is differentiated by one from the number of ultrasonic transducers used in the receive period, and each group of ultrasonic transducers put in operation is shifted one place in every second scanning, thereby accomplishing half-pitch scanning. That is, the thirteen transducers, e.g., ①- ⑬, are excited in the transmit period and the received signals from the twelve transducers ①- ⑫, which are reduced by one from the transmit transducers, are selected in the receive period.

In the foregoing arrangement, the focal point of ultrasonic waves lies at $P_1$ if delay times determined by an arc $S_1$ are applied to the respective ultrasonic transducers ①- ⑬ in the transmit period. On the other hand, if delay times determined by an arc $S_2$ are applied to the respective ultrasonic transducers ①- ⑫ in the receive period, reflected waves coming from a focal point $P_2$ displaced one-half pitch from the focal point $P_1$ of the transmit period can be received most strongly, hence, reflected waves coming from a midpoint P between the focal points $P_1$ and $P_2$ can be received most strongly due to cooperation of transmitted and received ultrasonic waves. Accordingly, if for the next step the ultrasonic transducer group is shifted one place in the scanning direction or the X-direction, that is, if the ultrasonic transducers ②- ⑬ are selected to be used in the next receive period, a new focal point $P_2$ lies at the position displaced one-half pitch to the right from the focal point $P_1$. As a result, the point P also shifts one-half pitch to the right.

Further, by using the transducers ②-⑭ in the next transmit period and similarly shifting each combination of transducers to be used in the transmit period and in the receive period alternately by one place in the scanning direction, half-pitch scanning can be accomplished which provides one scan line per half-pitch. Accordingly, there can be obtained a sectional image of an equivalent quality to that achieved in a system wherein the pitch of ultrasonic transducers is reduced to one-half and the number of transducers is increased by a factor of two.

In the aforementioned conventional ultrasonic diagnostic system, when alternating even- and odd-numbered combinations of ultrasonic transducers are used with the same transmit period and receive period to achieve half-pitch scanning, each delay time t is identical for the transmit period and the receive period. Thus, the same focus circuit can be used as the transmit focus circuit 2 and as the receive focus circuit 8, i.e., for both transmission and reception, so that the configuration of the ultrasonic wave phase matching apparatus can be simplified. However, since the number of ultrasonic transducers used in each scan differs by one from one scan to the next, stripes appear in the resultant sectional image. Consequently, the desired enhancement of the image quality which is intended by carrying out half-pitch scanning is not entirely accomplished.

Further, in carrying out half-pitch scanning wherein the number of ultrasonic transducers used in the transmit period differs by one from the number used in the receive period and each ultrasonic transducer displaced in the scanning direction is put in operation at the time of every second scan, because the number of ultrasonic transducers used in the transmit period and in the receive period is always the same irrespective of repetition of the scan, the image degradation caused by stripes that appear when the number of ultrasonic transducers used differs from scan to scan can be avoided. Thus, with this procedure, a sectional image of excellent quality can be produced. However, since each delay time differs between the transmit period and the receive period with that procedure, the same focus circuit cannot be used as both the transmit focus circuit and the receive focus circuit. Therefore, this procedure is uneconomical.

It is an object of the present invention to overcome both of the problems encountered with conventional ultrasonic diagnostic systems in connection with the above-described half-pitch scanning processes, and to enable the use of one focus circuit as both a transmit focus circuit and a receive focus circuit, while providing sectional images of excellent quality.

SUMMARY OF THE INVENTION

To solve the foregoing problems according to the present invention, an ultrasonic diagnostic system for visualizing a sectional plane of an object to be examined by selecting a plurality of excited ultrasonic transducers and controlling each amplitude and phase of transmitted and received ultrasonic waves to converge ultrasonic beams within the object and reconfigure the reflected waves coming from a given area including a focal point includes a main delay unit for providing predetermined delay times corresponding to distance differences between the focal point and the plurality of excited ultrasonic transducers mainly on the basis of delay times of received signals, a pre-delay unit for fine control of the delay times provided by the main delay unit in accordance with the differences between transmit delay times and receive delay times, and a transmit-receive switching control unit responsive to a predetermined timing for connecting the main delay unit to a receive circuit side during a receive period and for connecting a series combination of the main delay unit and the pre-delay unit to a transmit circuit side during a transmit period.

In the ultrasonic diagnostic system of the invention wherein the main delay unit provides delay times corresponding to distance differences between the focal point and the respective excited ultrasonic transducers on the basis of the received signals, and the pre-delay unit provides fine control of the delay times of the main delay unit in accordance with differences between the transmit delay times and the receive delay times, the transmit-receive switching control circuit connects the main delay unit to the receive circuit side at a predetermined time in the receive period and connects the series combination of the main delay unit and the pre-delay unit to the transmit circuit side at a predetermined time in the transmit period. This requires only one main delay unit for both transmission and reception and permits compensation for the differences between the transmit delay times and the receive delay times that become large during the transmit period by connecting the pre-delay unit in series. Further, since half-pitch scanning can be achieved using a scanning method wherein the number of excited ultrasonic transducers differs by one between the transmit period and the receive period and each displaced transducer is put in operation at the time of every second scan, it is possible to eliminate stripes of the sectional image that would otherwise arise if the number of ultrasonic transducers differs from one scan to the next scan.

DESCRIPTION OF THE PREFERRED EMBODIMENT

The present invention will now be described with reference to an embodiment.

Figure 5:
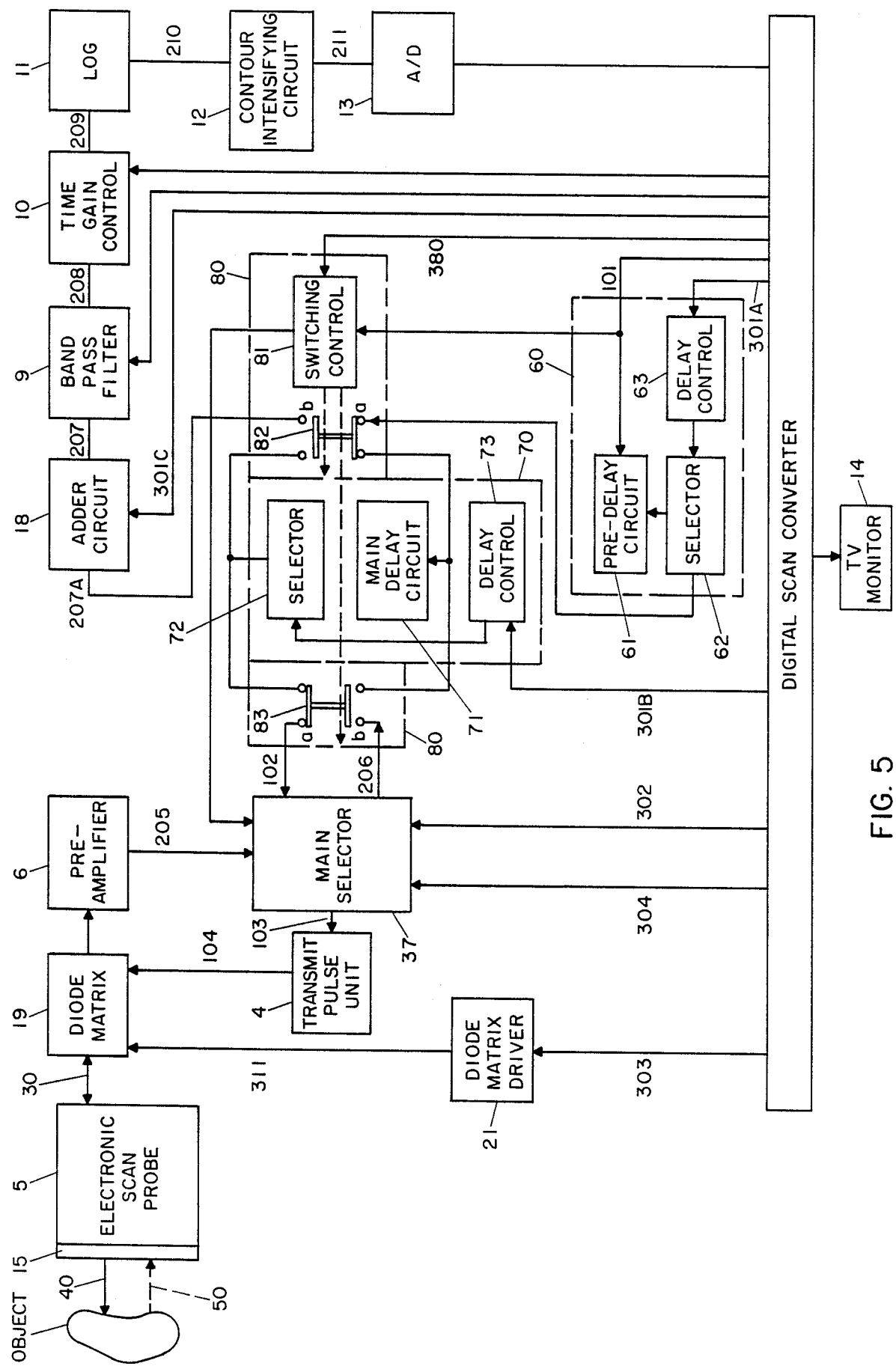
FIG. 5 is a schematic block diagram illustrating a representative embodiment of an ultrasonic diagnostic system in accordance with the invention.

In FIG. 5, which is a schematic circuit configuration diagram of one embodiment of an ultrasonic diagnostic system in accordance with the invention, portions identical with those of the prior art embodiments shown and described in connection with FIG. 1 are designated by the same reference numerals used in the description of FIG. 1 and a detailed description thereof is omitted. In FIG. 5, the reference numeral 60 designates a pre-delay unit which is composed of a pre-delay circuit 61, a selector 62 and a delay control 63. The pre-delay circuit 61 comprises, for example, a plurality of delay lines with mid-terminals, which imposes delays on the transmit timing pulses 101 received from the DSC 1 to generate a plurality of delay transmit timing pulses of different delay times. The selector 62 contains, for example, a switch array which selects and provides the delay transmit timing pulses 102 representing differences between the transmit delay times and the receive delay times relating to a given focal point from among the plurality of delay transmit timing pulses generated by the pre-delay circuit, selection of the delay transmit timing pulses 102 being controlled by the delay control 63 whose input is a delay control signal 301A received from the DSC 1.

Reference numeral 70 designates a main delay unit which is composed of a main delay circuit 71, a selector 72 and a delay control 73. The main delay unit 70 is identical in configuration with the pre-delay unit, except that the delay times provided by the main delay circuit 71 are determined according to the delay times necessary to achieve phase coincidence of the ultrasonic received signals 206, selection of delayed pulses being controlled by a delay control signal 301B sent from the DSC 1 to the delay control 73.

Reference numeral 80 designates a transmit-receive switching control circuit which is composed of a transmitreceive switching control 81, and changeover switches 82 and 83. The transmit-receive switching control circuit 80 is adapted, in response to the output control signal of the transmit-receive switching control 81 whose switching timing is controlled by a switching control signal 380 given from the DSC 1, to control and switch the changeover switches 82 and 83 to the a-side in the transmit period and to the b-side in the receive period. As a result, during the transmit period the pre-delay unit 60 and the main delay unit 70 are connected in series via the a-side contact of the changeover switch 82, and the selector 72 of the main delay unit 70 is connected to conduct via the a-side contact of the changeover switch 83 to a main selector 37 which is provided for both transmission and reception. Accordingly, the transmit timing pulses 101 received from the DSC 1 are imposed with delays corresponding to the sums of the respective delay times of the pre-delay unit 60 and the main delay unit 70, and the delay transmit timing pulses 102 are transmitted to the main selector 37.

On the other hand, in the receive period the pre-delay unit 60 is disconnected from the main delay unit 70 by the changeover switches 82 and 83, the ultrasonic received signals 206 transmitted by the main selector 37 are imposed with predetermined delays on the main delay circuit 71 of the main delay unit 70 after passing through the b-side contact of the changeover switch 83, and resultant phase-coincided, delayed ultrasonic received signals 207A are selected by the selector 72 and sent to an adder circuit 18.

The adder circuit 18 corresponds to the adder circuit section of the receive focus circuit 8 of the conventional system shown in FIG. 1, but it is separated and made independent. The delayed ultrasonic received signals 207A are combined in the adder circuit 18 and converted into the single ultrasonic received signal 207.

Incidentally, transmit-receive timing is realized in the transmit-receive switching control circuit 80 by switching the changeover switches 82 and 83 to the a-side (the transmit side) during an interval of a few ns, i.e., from emission of the ultrasonic waves 40 from the excite ultrasonic transducers 15 to the reception by the same ultrasonic transducers of a part of the ultrasonic waves 40 which has been reflected by the surface of the object to be examined (or the probe surface).

The half-pitch scanning operation in the ultrasonic diagnostic system equipped with the wave phase matching apparatus which is composed of the main delay unit, pre-delay unit and transmit-receive switching control circuit will now be described in greater detail with reference to FIGS. 6 and 7.

Figure 6:
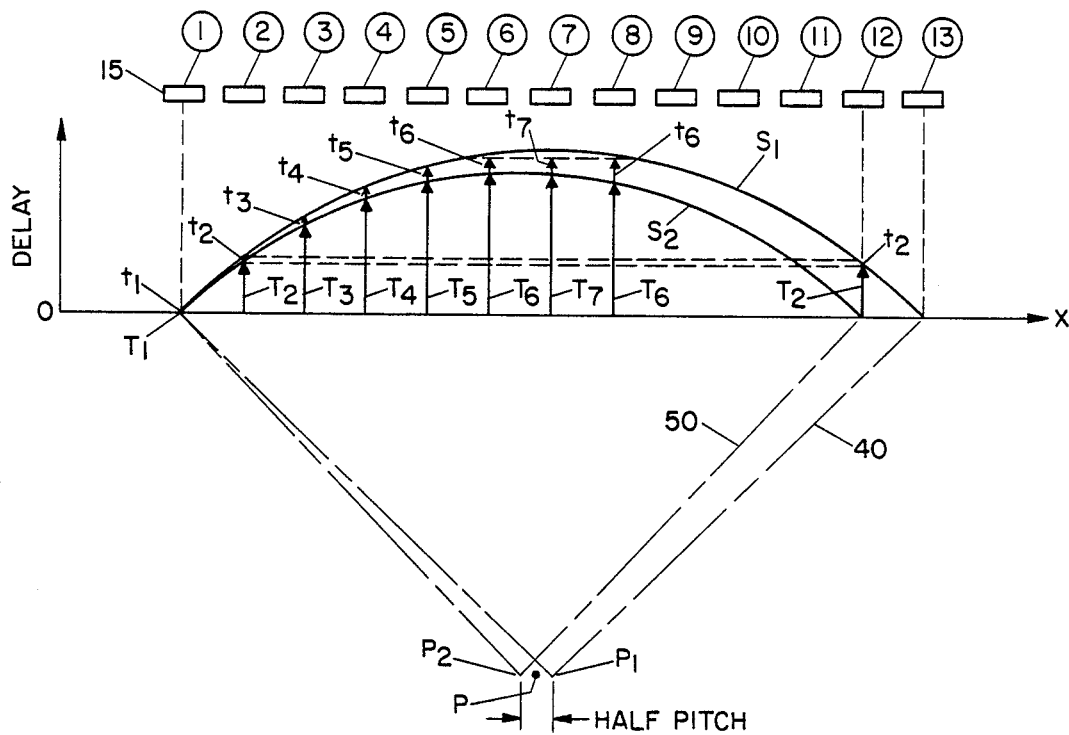
FIG. 6 is a schematic graphical diagram useful in explaining the delay times for half-pitch scanning in the embodiment of FIG. 5.

FIG. 6 is an exemplary diagram illustrative of half-pitch scanning in accordance with the invention. In the case to be described, thirteen ultrasonic transducers 15 are selected and excited in the transmit period, whereas in the receive period twelve of the thirteen transducers are selected to perform reception. In FIG. 6, the reference symbol $S_1$ designates a curve which defines the delay times necessary to focus the transmitted ultrasonic beams 40 on the position $P_1$ by exciting the thirteen ultrasonic transducers ①-⑬, and $S_2$ designates a curve which defines the delay times for the received ultrasonic signals that are necessary to receive most strongly the reflected ultrasonic waves 50 coming from the position $P_2$ which is displaced by one-half pitch from the focal point $P_1$ and is established in the transmit period by the use of the twelve ultrasonic transducers ①-⑫, the arrows $t_{1l}$, $t_2$, etc., between the curves $S_1$ and $S_2$ representing the laterally-asymmetric differences between those delay times.

Therefore, in the illustrated embodiment, the delay times of the main delay unit 70 are determined by the delay times of the received ultrasonic waves that satisfy the curve $S_2$, whereas in the transmit period the delay times of the pre-delay unit 60 are added to the delay times of the main delay unit 70 selected in the receive period to compensate for the time differences and thereby obtain the transmitperiod delay times determined by the curve $S_1$. Further, the asymmetry of the time differences is amended by displacing under a certain condition the respective positions of the ultrasonic transducers requiring the transmit period delay times. Consequently, there is provided a wave phase matching apparatus whose main delay unit is used for both transmission and reception.

Specifically, the main delay unit 70 selects six delay times $T_1$-$T_6$ indicated by the solid-line arrows, inclusive of zero delay time, during the receive period. The selected delay times $T_1$-$T_6$ are laterally symmetrically applied both to the ultrasonic transducers ①-⑥ and to the ultrasonic transducers ⑦-⑫. The resultant reflected ultrasonic waves 50 coming from the focal point $P_2$ are received by the ultrasonic transducers ①-⑫ and transmitted through the diode matrix 19 and the preamplifier 6 to the main selector 37 (FIG. 5), the output thereof having been switched to the receive side by the output signal of the transmit-receive switching control 81. The resultant ultrasonic received signals 206, the number of which is reduced to six by the control signal 304 received from the DSC 1, are imposed with the delay times $T_1$-$T_6$ by the main delay unit 70 to achieve phase coincidence (electronic focusing) and are added together in the adder circuit 18 to provide a single received ultrasonic signal 207.

On the other hand, during the transmit period, the main delay unit 70 selects one delay time $T_7$ in addition to the delay times $T_1$-$T_6$. Similarly, the pre-delay unit 60 selects seven delay times $t_1$-$t_7$ ($t_1$=0) corresponding to the time differences. The main delay unit 70 and the pre-delay unit 60 are connected in series by the transmit-receive switching control circuit 80, so that the transmit timing pulses 101 given from the DSC 1 are imposed with delays equivalent to ($T_1$ +$t_1$), ($T_2$ +$t_2$), etc., to generate seven delay transmit timing pulses 102 which are sent to the main selector 37. The main selector 37 having been switched to the transmit side by the output signal of the transmit-receive switching control 81 for both transmission and reception, the seven delay transmit timing pulses 102 are converted into at least thirteen selectively delayed transmit timing pulses 103 by the control signal 302 given from the DSC 1, so that thirteen ultrasonic transmit pulse voltage signals 104 are provided from the transmit pulse unit 4. The diode matrix 19 selects the transducer in the ultrasonic transducer array of the electronic scan probe 5 to which each voltage signal 104 is to be sent.

In the illustrated embodiment, under the selective control by the control signal 311 from the matrix driver 21, the delay time of ($T_7 + t_7$) is applied to the center ultrasonic transducer ⑦, while the delay times of ($T_1 + t_1$) -($T_6 + t_6$) are laterally symmetrically applied to the ultrasonic transducers ①-⑥ and to the ultrasonic transducers ⑧-⑬. Because of the foregoing configuration, asymmetry of the time differences between the curves $S_1$ and $S_2$ can be avoided, and the ultrasonic beams 40 emitted from the ultrasonic transducers ①-⑬ can be focused on the focal point $P_1$ by means of the seven delay transmit timing pulses 102 generated by the main delay unit and the pre-delay unit. Consequently, due to cooperation or interaction of the transmitted and received ultrasonic waves, one scan line can be obtained which contains the most intensified sectional plane information coming from the mid-position P between the focal points $P_1$ and $P_2$.

Figure 7:
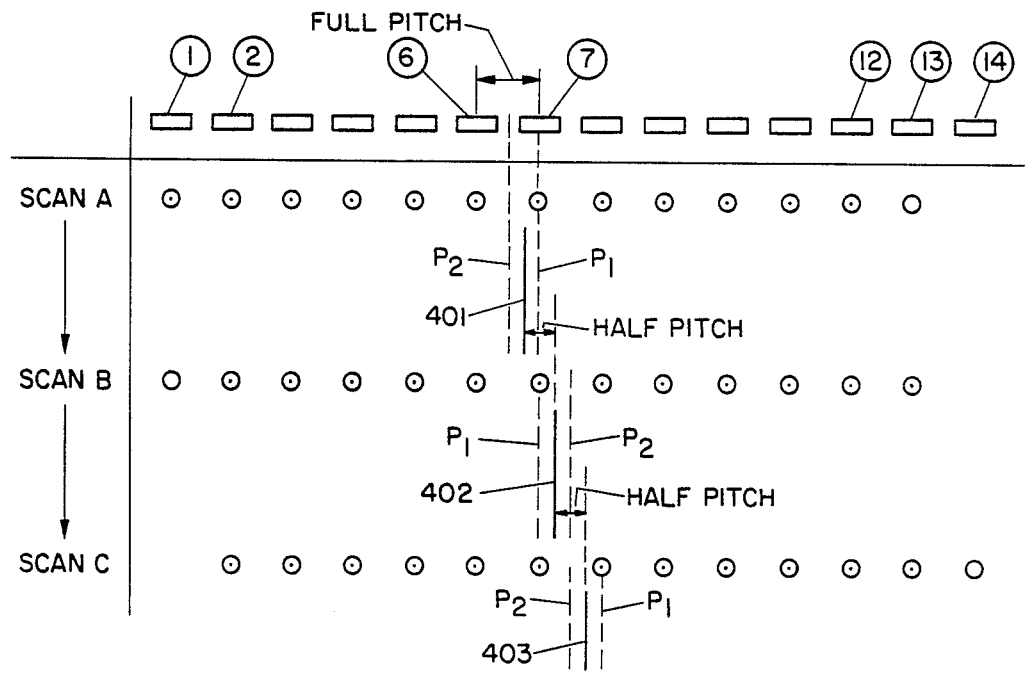
FIG. 7 is a diagram useful in explaining the steps used in half-pitch scanning in the embodiment of FIG. 5.

FIG. 7 is an explanatory diagram illustrative of the half-pitch scanning in the illustrated embodiment, wherein the symbol ◯ designates excited ultrasonic transducers and the symbol ⊙ designates those being used in both the transmit period and the receive period. In this illustration with respect to a first scan A, the ultrasonic transducers ①-⑬ are excited, so that the transmitted ultrasonic waves are focused to make the focal point $P_1$ on the broken line passing the center of the transducer ⑦. In the receive period, the reflected ultrasonic waves coming from the focal point $P_2$ displaced one-half pitch from the focal point $P_1$ are received by the ultrasonic transducers ①-⑫, so that a scan line 401 obtained through cooperation among the transmitted and received waves contains most strongly the information of the mid-point between the focal points $P_1$ and $P_2$ (i.e., the position displaced one-quarter pitch leftward from the center of the transducer ⑦). In a second scan B, the ultrasonic transducers used in the transmit period are ①-⑬ and this does not differ from the case of the scan A. Thus, the position of the focal point $P_1$ is unchanged. However, since the receive ultrasonic transducers are ②-⑬, providing a one-pitch rightward shift, the focal point $P_2$ shifts one-half pitch rightward from the focal point $P_1$. Thus, a scan line 402 obtained in scan B shifts one-half pitch rightward from the scan line 401.

In a third scan C, the receive ultrasonic transducers are ②-⑬ and, since this does not differ from the case of the scan B, the focal point $P_2$ is also unchanged. However, since the transmit ultrasonic transducers are ②-⑭, providing a one-pitch rightward shift, the focal point $P_1$ also shifts one pitch rightward. Thus, a scan line 403 obtained during scan C shifts one-half pitch rightward in reference to the scan line 402. In this way, by repeating the scanning operation while shifting alternately one pitch in the scanning direction each group of ultrasonic transducers selectively used in the transmit period and in the receive period, one scan line can be obtained per half-pitch.

In the illustrated embodiment, one-pitch scanning can be achieved if all the delay times $t_1$-$t_n$ provided by the predelay unit are set to zero, the transmit-receive switching control signal sent from the transmit-receive switching control 81 to the main selector 37 is fixed to either transmission or reception, and the same ultrasonic transducers are put into operation for both transmission and reception.

The above-described embodiment is configured so that the main selector 37 is used for both transmission and reception, being switched to either the transmission mode or the reception mode by the control signal transmitted from the transmit-receive switching control 81. Specifically, the main selector 37 selects the transmitting elements 4 by the control signal 302 received from the DSC 1 during the transmit period and the delay times of the main delay unit 70 by the control signal 304 during the receive period. However, this may be modified such that the selectors 3 and 7 (FIG. 1) are provided independently for the transmit side and for the receiving side, respectively, as in the conventional system.

The delay circuit used for achieving electronic focusing in the type of ultrasonic diagnostic system described herein handles the received ultrasonic signal which includes high-frequency components covering a wide range of from a few MHz to a few hundred MHz, and for this purpose, a high-frequency wideband delay line is required. Generally, the longer the delay time, the higher the cost of the delay line. In this respect, the wave phase matching apparatus according to the present invention has the advantages that the expensive main delay circuit can be used for both transmission and reception; delay time errors between transmission and reception can be avoided because of the use of one delay circuit for both transmission and reception in contrast to a system employing separate delay circuits for transmission and for reception; and the quality of the sectional image obtained using normal and half-pitch scanning is enhanced. In this connection, for an ultrasonic diagnostic system it is necessary to change the focal point and frequency stepwise in order to visualize the sectional plane of the object, and the shape of the electronic scan probe employed must be linear or convex or some other shape, depending on the application. Consequently, the number of mid-tap terminals provided on the delay line may be as high as several tens times the number of delay times selected at any one time, and it is inevitable that delay time errors will increase proportionally. Therefore, the provision of a main delay circuit for both transmission and reception is very significant from the viewpoint of economy and performance.

Further, for an ultrasonic diagnostic system, it is necessary to change the frame rate (the number of pictures per second) of the sectional image displayed on the TV monitor depending on which section of the object is to be visualized; for example, between a stationary portion such as a head section and a moving portion such as a heart. In the wave phase matching apparatus according to the present invention, since full-pitch scanning can easily be achieved by using the same number of ultrasonic transducers during the transmit period and the receive period (that is, by fixing the transmit-receive switching control signal sent to the main selector 37 to the transmit side or the receive side) and selecting the same delay times in the receive period and in the corresponding transmit period, it is possible to enhance the image quality by performing half-pitch scanning when reproducing a sectional image of a stationary section and, on the other hand, to double the frame rate to slow down the movement of the image by performing full-pitch scanning when reproducing a sectional image of a moving portion.

As described hereinabove, according to the present invention, the main delay unit for providing delay times necessary in the receive period is controlled by the transmit-receive switching control circuit so that delay times necessary in the transmit period which are the sums of the delay times of the main delay unit and those of the pre-delay unit are provided in the transmit period, and one extra delay time is selected and applied in the transmit period to the central ultrasonic transducer, whereby asymmetry of the discrepancy times between the transmit delay times and the receive delay times can be avoided. Therefore, it is possible to overcome the problem of the prior art in which stripes appear in the picture if the number of ultrasonic transducers put in operation differs from scan to scan and the problem of the prior art wherein, if generation of stripes is avoided, half-pitch scanning cannot be achieved if one delay circuit for electronic focusing is used during both transmission and reception. Therefore, the profitability of the system of the invention is superior because of dual use of the expensive delay circuit, and half-pitch scanning can be achieved without generating stripes in the picture. Hence, there is provided an ultrasonic wave phase matching apparatus capable of producing superior sectional images.

Further, since the main delay unit controlling the major part of the transmit and receive delay times can be used in both periods, thereby removing most of the delay time errors for the transmit period and the receive period, the present invention provides an ultrasonic diagnostic system having the ability to produce excellent quality images and having the flexibility to be switched easily between half-pitch scanning and full-pitch scanning depending on the section of the object to be examined. Furthermore, since the selector can be used for both transmission and reception if required, the present invention can provide an ultrasonic diagnostic system of high profitability.

Although the invention has been described herein with reference to a specific embodiment, many modifications and variations therein will readily occur to those skilled in the art. Accordingly, all such variations and modifications are included within the intended scope of the invention.

I claim:

1. An ultrasonic wave phase matching apparatus for visualizing a sectional plane of an object to be examined by selecting a plurality of excited ultrasonic transducers and controlling each amplitude and phase of transmitted and received ultrasonic waves to converge ultrasonic beams within the object and reconfigure reflected waves coming from a given area including a focal point comprising main delay means for providing predetermined delay times corresponding to distance differences between the focal point and the plurality of excited ultrasonic transducers at least partially on the basis of delay times of received ultrasonic wave signals, pre-delay means for fine-controlling the delay times provided by said main delay means according to differences between transmitted ultrasonic wave delay times and received ultrasonic wave delay times, and transmit-receive switching control circuit means for connecting said main delay means to a receive circuit side during a receive period and for connecting a series combination of said main delay means and said pre-delay means to a transmit circuit side during a transmit period.

* * * * *